(12) United States Patent
Bernard et al.

(10) Patent No.: US 6,332,740 B1
(45) Date of Patent: Dec. 25, 2001

(54) DEVICE FOR CONVEYING OBJECTS SUCH AS, IN PARTICULAR, BOTTLES, FLASKS OR THE LIKE

(75) Inventors: Frédéric Bernard, Villeneuve d'Ascq; Philippe Bondepierre, Ghyvelde, both of (FR)

(73) Assignee: Rafale Technologies, Societe Anonyme, Perenchies (FR)

(*) Notice: Subject to any disclaimer, the term of this patent is extended or adjusted under 35 U.S.C. 154(b) by 0 days.

(21) Appl. No.: 09/331,384

(22) PCT Filed: Oct. 17, 1997

(86) PCT No.: PCT/FR97/01856

§ 371 Date: Jun. 18, 1999

§ 102(e) Date: Jun. 18, 1999

(87) PCT Pub. No.: WO98/17557

PCT Pub. Date: Apr. 30, 1998

(30) Foreign Application Priority Data

Oct. 18, 1996 (FR) .................................................. 96 12929
Oct. 18, 1996 (FR) .................................................. 96 12930
Oct. 18, 1996 (FR) .................................................. 96 12928

(51) Int. Cl.[7] ............................ B65G 23/16; B65G 23/28
(52) U.S. Cl. ......................... 406/88; 406/86; 1987/860.3
(58) Field of Search .................... 406/86, 88; 198/860.3, 198/860.5

(56) References Cited

U.S. PATENT DOCUMENTS 2,793,738 * 5/1957 Erickson ........................ 198/860.3
3,147,852 * 9/1964 Hanson, Jr. .................... 198/860.3
4,284,370 * 8/1981 Danler et al. ....................... 406/86
5,100,265 * 3/1992 Mirkin ............................... 406/86
5,147,153 * 9/1992 Aidlin et al. ....................... 406/86
5,161,919 * 11/1992 Smith et al. ....................... 406/86
5,246,314 * 9/1993 Smith et al. ....................... 406/86
5,421,678 * 6/1995 Aidlin et al. ....................... 406/88
5,437,521 * 8/1995 Ouellette ............................ 406/88
5,516,239     5/1996 Warren et al. .
5,542,789     8/1996 Aidlin et al. .
5,628,588 * 5/1997 Ouellette ............................ 406/88
5,695,302 * 12/1997 Hilbish .............................. 406/88
5,947,647 * 9/1999 Ouellette .......................... 406/191
6,024,518 * 2/2000 Ouellette ............................ 406/88

FOREIGN PATENT DOCUMENTS 1244652   7/1967  (DE) .
9306657   9/1994  (DE) .
0649804   4/1995  (EP) .
05246542 * 6/1992  (JP) .
WO9605127 2/1996  (WO) .

* cited by examiner

Primary Examiner—Donald P. Walsh
Assistant Examiner—Richard Ridley
(74) Attorney, Agent, or Firm—Harrison & Egbert

(57) ABSTRACT

A device for conveying objects having a protuberance at their neck including a blowing chamber for blowing an air flux for driving the objects and a support rail cooperating with the objects at the protuberance. The chamber includes a body and a plate removably attached thereto. The support rail is fixed to the plate. There are at least two frame members on either side of the rail along the blowing chamber.

19 Claims, 3 Drawing Sheets

DEVICE FOR CONVEYING OBJECTS SUCH AS, IN PARTICULAR, BOTTLES, FLASKS OR THE LIKE

The present invention relates to a device for conveying objects such as, in particular, bottles, flasks or other articles.

However, although more especially intended for such applications, it can also be used, in general, for any object having an end provided with an excrescence, or protuberance.

At the present time, in the field of conveying, it is known to transport bottles by projecting a stream of air onto one or more parts of their surfaces and thus cause them to be displaced in a given direction.

According to a preferred form of embodiment of this process, the bottles are propelled by a jet of air acting in the area of their necks.

The corresponding devices generally comprise a blowing chamber and a support rail. The blowing chamber is supplied by fans and enables the air introduced to be compressed, the air then being projected towards the necks of the bottles via slits, provided on the surface of the said blowing chamber.

The structure of the slits enables the air stream projected to be orientated and thus ensure that the bottles are transported in the desired direction.

The support rail co-operates with a protuberance provided in the area of the necks of the bottles conveyed and contributes to guiding them. It is generally secured to the lower face of the blowing chamber, also referred to as an 'apron'.

In presently known devices, the blowing chamber is made in one piece and numerous parts are mounted on its different faces, such as, armatures for supporting the device, lateral guides to facilitate the guiding of the bottles in the area of their bodies, cheek pieces, protecting the bottles along their path, and/or other items.

As to the lateral guides, in most known installations, they are secured to the apron. They are positioned via the translation movements of members that are mobile in relation to one another.

In order to be efficient, the lateral guides need to be finely and meticulously adjusted to suit the profile of each bottle transported, since any mis-adjustment can lead to long operating delays.

Although such conveying processes represent a solution with numerous advantages for transferring bottles, the presently known devices nonetheless have drawbacks.

First of all, as indicated above, their blowing chambers are made in one piece and are not, therefore, easily accessible.

Indeed, the blowing chambers owe their rigidity to the fact that their walls are assembled directly to one another, or to the use of a sheet of metal bent into an inverted U shape, closed at its base by the apron, which then defines a base.

In addition, the structure of the latter is often braced to enable it to support, as mentioned earlier, accessory devices such as lateral guides, protective cheek pieces or other items.

The apron is not, therefore, easy to disassemble and does not enable the operator to carry out maintenance operations inside the blowing chambers, not, in any case, without the risk of disturbing the adjustment of the installation.

As a result, the blowing chambers cannot, for instance, be cleaned easily and quickly, whereas, in the fields in which the devices are used, namely, for instance, in the farm-produce industry, hygiene requirements are increasingly severe.

A further drawback of such devices is that they lack modularity. Thus, in order to work on one of their components, for example, one of the walls of the blowing chamber, it is often necessary to dismantle the entire installation and/or disturb the adjustment of neighbouring components, for example, the lateral guides.

It will also be noted that presently known devices have many points, in particular screws, bolts and nuts, liable, for example, to allow dirt to accumulate.

A further drawback of such devices is that their lateral guides take a relatively long time to adjust. In addition, they can prove difficult to use, particularly when cheek pieces are installed along the device.

The object of the present invention is to provide a blowing type conveyor device that overcomes the aforementioned drawbacks and facilitates assembly, adjustment, maintenance and/or cleaning.

Another object of the present invention is to provide a blowing conveyor device the blowing chamber of which is easily accessible, in particular in order to facilitate its cleaning, without any risk of disturbing its adjustment.

A further object of the present invention is to provide a blower conveying device of enhanced strength.

Another object of the present invention is to provide a blower conveying device in which there is no risk of the deformation of the body of the blowing chamber and/or of any lateral guides during the passage of a train of objects to be conveyed disturbing the adjustment of the support rail for the objects.

Another object of the present invention is to provide a blower conveying device having a modular structure.

A further object of the present invention is to provide a blower conveying device that makes it possible, for example, to carry out work on its blowing chamber without affecting the adjustments, in particular those of its lateral guides, if any.

Another object of the present invention is to provide a blower conveying device adjustments to which are simplified both at the time of installation and during use, particularly in the event of changing the profiles of the objects transported.

Another object of the present invention is to provide a blower conveying device facilitating the use of a cheek member for protecting the objects transported.

A further object of the present invention is to provide a blower conveying device that does not have any areas liable to lead to the retention of dirt, in particular surface mounted screws, nuts and bolts.

Other objects and advantages of the present invention will emerge in the course of the following description, which has been provided only by way of illustration and is not intended to limit same.

SUMMARY OF THE INVENTION

The present invention relates to a device for conveying objects such as, bottles, flasks or other articles, having an protuberance in the area of their necks, including a blowing chamber, permitting the projection of a stream of air capable of driving the objects, and a support rail, co-operating with the objects in the area of the protuberance, wherein the chamber is constituted by a body and an apron, removable in relation to the body, the support rail being secured to the said apron.

The present invention also relates to a device for conveying objects such as, bottles, flasks or other articles, having an protuberance in the area of their necks, including a blowing chamber, permitting the projection of a stream of air capable of driving the objects, and a support rail, capable of co-operating with the objects in the area of their protuberance, wherein the that it is provided with at least two longitudinal support members provided on either side of the device along the blowing chamber and the rail.

The present invention also relates to a device for conveying objects such as, bottles, flasks or other articles, having a protuberance in the area of their necks, including a blowing chamber, permitting the projection of a stream of air capable of driving the objects, a support rail, capable of co-operating with the objects in the area of their protuberance, and lateral guides capable of facilitating the transport of the objects, lateral guides are constituted at least by a guide rail, provided along the device facing the bodies of the objects, and by rods to support the rail, the rods and the rail co-operating with one another at least by rotary articulation, so as to ensure the adjustment of the transverse position of the rail in relation to the objects.

BRIEF DESCRIPTION OF THE DRAWINGS

The present invention will be more clearly understood from a study of the following description, accompanied by the annexed drawings, which form an integral part thereof, and wherein.

DETAILED DESCRIPTION OF THE INVENTION

The present invention relates to a device for conveying objects such as, bottles, flasks or other articles.

However, although more especially intended for such applications, it clan also be used, in general, for any object provided with an end having a protuberance.

Figure 1:
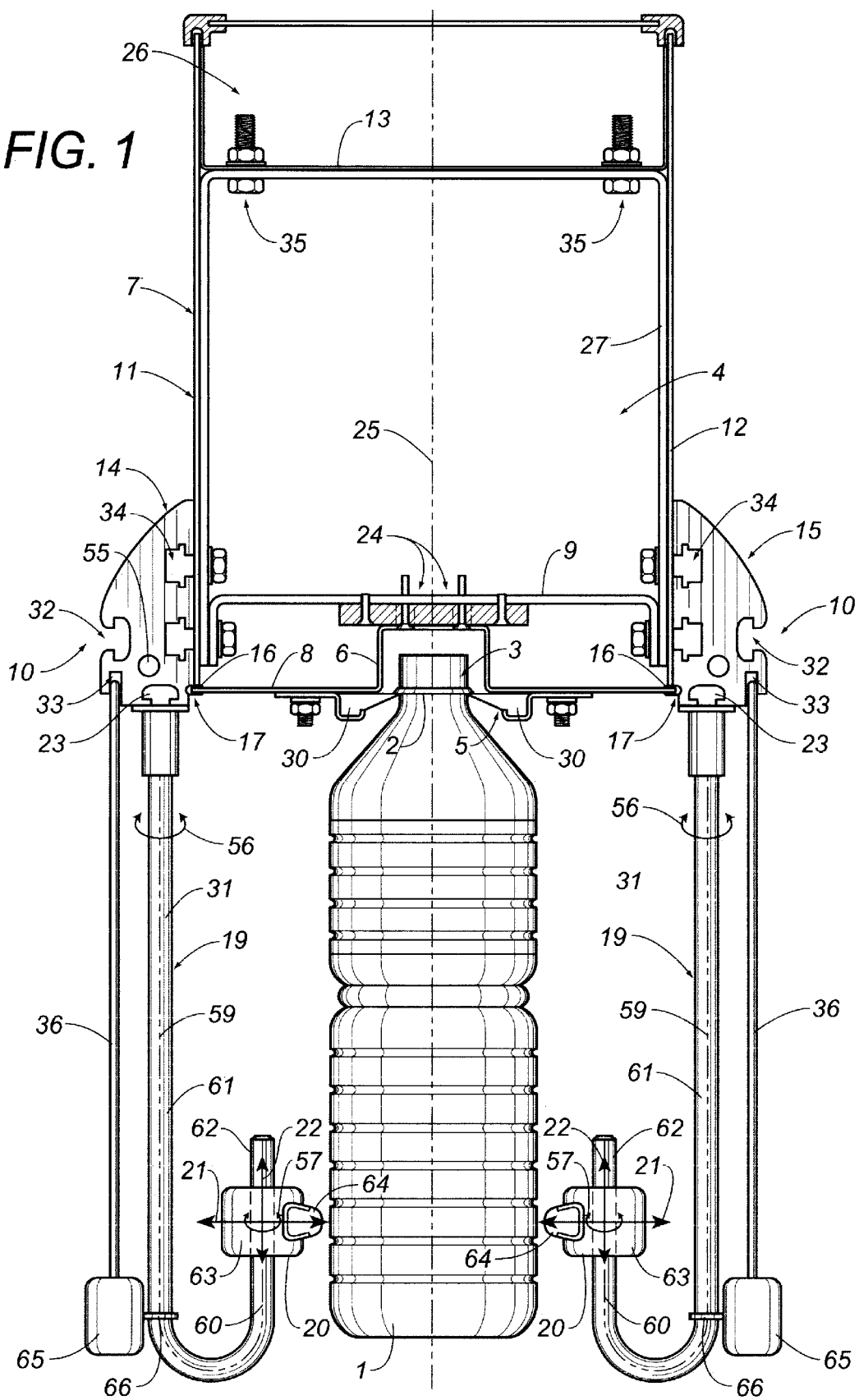
FIG. 1 is a transverse, cross-sectional view, of an exemplary form of embodiment of the conveying device according to the invention.
Figure 2:
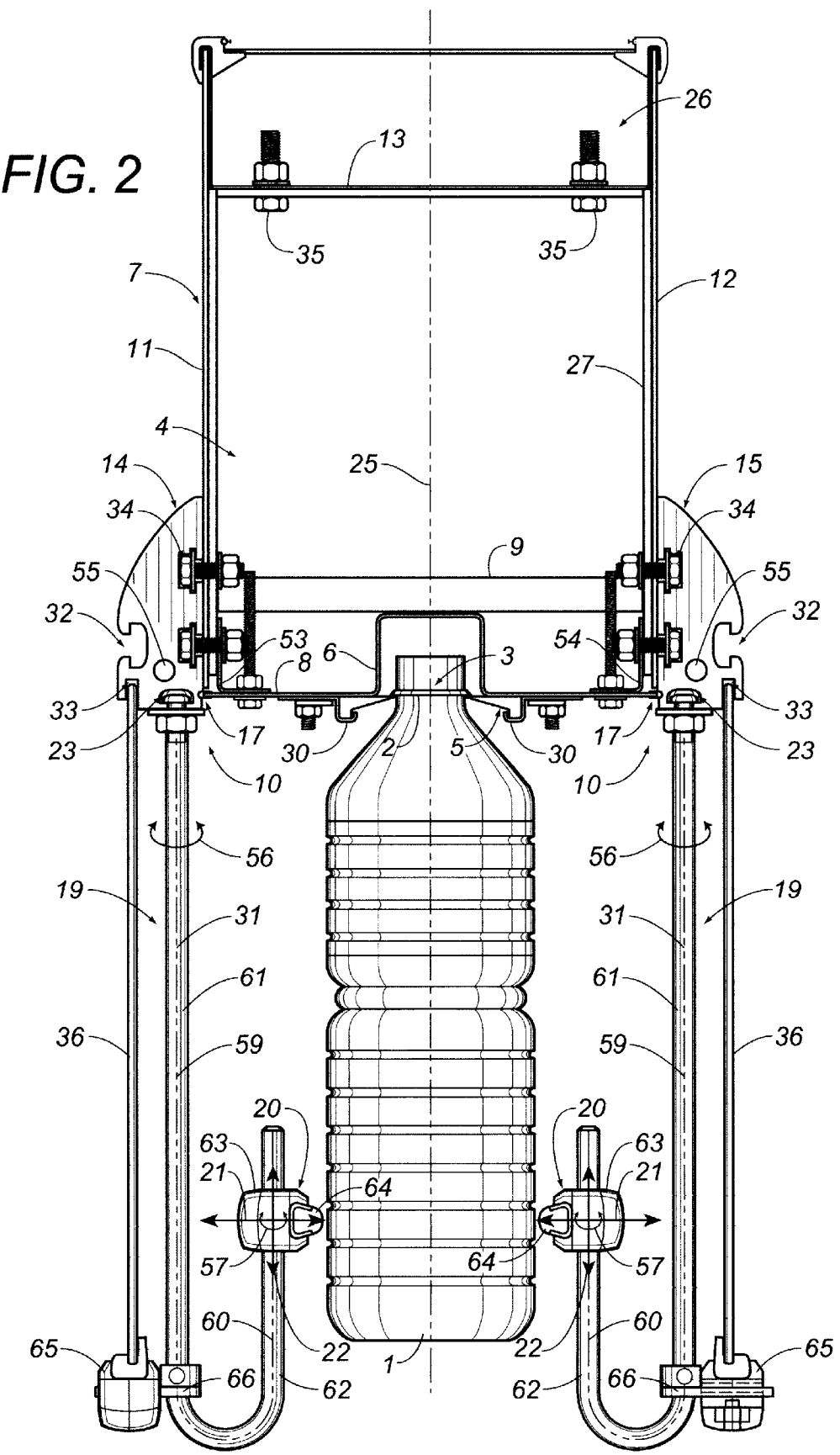
FIG. 2 is a similar view of a second exemplary form of embodiment of the conveying device according to the invention.

As shown in FIGS. 1 and 2, the conveying device according to the invention makes it possible to transport objects 1 having an protuberance, 2, in particular an annular one, in the area of their necks 3 in a direction substantially orthogonal to the plane of the figures.

For this purpose, in a known manner, the device includes a blowing chamber 4 permitting the projection of a stream of air capable of driving the objects 1 in a desired conveying direction. It also includes a support rail, 5, co-operating with the objects 1 in the area of their protuberance 2, the support rail 5 being orientated in the conveying direction.

According to the invention, the objects 1, guided substantially vertically, are thus transferred beneath the blowing chamber 4, for example from a forming unit to a filling unit.

The blowing chamber 4 has, in particular, in the area of its lower face, a channel 6 provided with slits, on its side walls. The slits, not shown in FIGS. 1 and 2, are capable of permitting the projection of the air stream in the direction of the necks 3 of objects 1, with the latter passing through the channel.

The support rail 5 is constituted, in particular, by two upper rails 30, made of plastic and/or stainless steel which, with the orientated air stream, enable the objects 1 to be guided along their path.

According to the invention, the chamber 4 is constituted by a body, 7, and by an apron, 8, which is removable in relation to the body 7. The support rail 5 is secured to the apron 8, the latter also defining, in particular, the channel 6.

Blowing chamber 4 is thus easily accessible, by disassembling the apron 8, and its cleaning, as well as evacuation of the products used for this purpose, is simplified.

According to the form of embodiment illustrated, the device according to the invention also includes means, 10, for ensuring the air tightness of the connection between the apron 8 and the body 7.

The blowing chamber 4 is designed, so as to be substantially quadrangular, and the body 7 is constituted, in particular, by two lateral sides, 11, 12, and a cover, 13.

The body 7 is designed as a braced framework. For this purpose, the lateral sides 11, 12 are, stiffened, and the body 7 includes transverse support members 9, integral with the lateral sides 11, 12.

The transverse support members 9 are, provided at regular intervals along blowing chamber 4, in the conveying direction for objects 1.

The stiffened lateral sides 11, 12 include, in particular, two longitudinal members, 14, 15, provided laterally along the body 7 and/or a reinforcing armature, constituted by bows, or arches, 27, provided at regular intervals in the same direction. The longitudinal members 14, 15, provided, externally, and the arches, provided internally, sandwich lateral sides 11, 12 of the body 7.

The longitudinal members 14, 15 thus play the part of longitudinal reinforcements, and the lateral walls 50, 51 can, as a result, simply serve to preserve the tightness of blowing chamber 4.

According to another form of embodiment, not shown, the stiffened sides, 11, 12, have, provided in the mass, stiffening wings, disposed laterally along the device.

This being the case, the means 10 for ensuring tightness are constituted, in particular, by the longitudinal members 14, 15, designed to be tightly integral with the body 7, and/or by joints 16, provided along the apron 8, capable of co-operating, with the longitudinal members 14, 15.

The latter thus make it possible to ensure a tight connection between the body 7 and the apron 8, and to prevent any loss of air prejudicial to blowing efficiency.

Joints 16 are provided on the longitudinal edges of the apron 8 and, according to the particular form of embodiment illustrated, the longitudinal members 14, 15 have at least one groove 17 suitable for receiving the joints 16.

The body 7 is sandwiched between the longitudinal members 14, 15 and the transverse member 9, disposed internally, designed to be integral with one another.

Body 7 possibly has a cover, 13, between its lateral sides 11, 12, and the arches 27 are secured, for example, to the cover 13.

The latter is possibly designed in the shape of a U and thus defines a trough, 26, between the lateral sides 11, 12 of the body 7. The said trough 26 will make it possible, in particular, to house various electric and/or other cables and it can be closed at its upper portion.

The advantage of such an arrangement is that it makes it possible to dispense with an independent trough, located above and/or beside blowing chamber 4 and defining, as a result, a gap, or interstice, in which dirt could accumulate.

The arch 27 runs along, in particular, side walls 50, 51 of body 7 and has points, 35, of attachment to the cover 13.

The points of attachment 35 can further, possibly, be used as points for holding the device on the ceiling of the premises on which it is installed, in particular via rods, not shown in FIGS. 1 and 2.

This being the case, according to a first form of embodiment, illustrated in FIG. 1, the apron 8 is secured to the transverse member 9, removably, in particular via at least one screw 24 and, advantageously, using two screws 24, offset in relation to the axis of symmetry 25 of the objects to be conveyed, in order to avoid impact in the region of the upper area of the neck.

The screws 24 are provided, in particular, in the area of channel 6 through which the necks 3 of the objects 1 travel, provided in the median portion of apron 8.

The transverse supporting members 9 are constituted, by a lower leg closing the arch 27.

According to another form of embodiment, illustrated in FIG. 2, apron 8 is secured to lateral sides 11, 12, via angle pieces, 53, 54. More precisely, two angle pieces 53, 54 are, secured to lateral sides 11, 12 using bolted screw rods, and the apron 8 is secured to the angle pieces 53, 54 via means of the same kind.

The transverse member 9 is, designed straight. The accuracy of its dimensions can thus be improved and the assembly 1 disassembly of apron 8 simplified.

To enhance the guiding of objects 1, the device according to the invention further includes, for example, lateral guides 19, constituted, in particular, by at least one guide rail 20, provided along the device, facing the body of the objects 1 and rods 31 for supporting the guide rail 20. The transverse position of the guide rails 20 can, be adjusted in the direction of arrows 21, while the vertical position of the rails 20 can, be adjusted in the direction of arrows 22.

According to the particular form of embodiment illustrated, the support rods 31 and the guide rail 20 co-operate with one another by rotary articulation to ensure the adjustment of the transverse position of the guide rail 20 in relation to the objects 1, in particular according to the horizontal cross-section of the latter. This is more fully described below.

In addition, the lateral guides 19 and the apron 8 are independent and thus permit access to the interior of the blowing chamber 4 after the apron 8 has been removed, without any risk of disturbing the alignment of the lateral guides 19, thus making for time saving during maintenance.

For this purpose, the lateral guides 19 as well as, possibly, the other auxiliary components provided, such as, protective cheek members 36, display panels, devices for halting the objects to be conveyed, or other items, are mounted on the stiffened lateral sides 11, 12. The apron 8 thus supports only, the rail 5.

It should be noted that the present structure makes it possible to enhance the strength of the device and, in particular, to avoid disturbing the adjustment of upper rails 30 constituting rail 5.

When the train of bottles, flasks or other articles passes, at high speed, they may, in fact, apply considerable stress to lateral guides 19. In the known prior art devices, such stress is transmitted directly to the apron, whereas, according to the invention, the said stress is taken up by support armature 9, in the area of its lateral ends, and is not, therefore, applied to the apron 8, thus preventing the adjustment of upper rails 30 from being disturbed. To reinforce this effect, the angle pieces 53, 54 are, made of a relatively flexible material.

The longitudinal members, 14, 15, are thus, capable of supporting the lateral guides 19. For this purpose, they are provided, in particular, with housings, 23, via which the said lateral guides 19 are secured to the longitudinal members 14 15 in the area of the upper ends of support rods 31.

Thus, the longitudinal members 14 15 make it possible both to ensure tightness between body 7 and removable apron 8, by means of the grooves 17, and to support, in particular, the lateral guides 19, independently of the removable apron 8, thanks to the recesses 23.

In addition the longitudinal members 14, 15, the arches 27, the angle pieces 53, 54 and/or the transverse member 9 are secured to one another, in particular, via a screw and nut system wherein the head of the screw co-operates with at least one housing 34, provided in the longitudinal members 14, 15. A detailed structural example of the longitudinal members 14, 15 is provided below.

The invention also relates, in fact, to a conveying device as described above, that is to say including a blowing chamber 4, permitting the projection of an air stream capable of driving the objects 1, and a support rail 5, capable of co-operating with the objects 1 in the area of their protuberance 2, the device being characterized by the fact that it is provided with at least two longitudinal support members 14, 15, provided on either side of the device, along the blowing chamber 4 and the rail 5.

The longitudinal support members 14, 15 thus make the device according to the invention modular by making it possible to receive its different elements independently of one another.

In addition, they enhance the longitudinal rigidity of blowing chamber 4 and make it possible, to use thinner sheet metal for its side walls 50, 51.

As shown in FIGS. 1 and 2, the device includes, an apron 8 to which is secured the rail 5, and, depending on the forms of embodiment illustrated, the blowing chamber 4 and/or the apron 8 is/are secured directly or indirectly to the longitudinal members 14, 15.

More precisely, according to the particular examples illustrated, the apron 8 forms the lower face of blowing chamber 4, the latter further including at least a body 7. The body 7 includes at least, in particular, two lateral sides, 11, 12, and a cover, 13.

The longitudinal members 14, 15 are further capable, of receiving armatures for supporting the device, from the floor and/or from the ceiling, not shown, lateral guides 19, designed to facilitate the transport of the objects 1, and/or cheek pieces 36, designed to protect the objects 1 during their travel.

The longitudinal members are provided outside the blowing chamber 4, for example in the area of the lower edge of its lateral edges, 11, 12.

They have, in particular, at least a first housing, 34, capable of permitting the introduction of the first means for securing the said longitudinal members, 14, 15, to the said blowing chamber 4, a second housing, 32, capable of permitting the introduction of second means for securing the said longitudinal members 14, 15 and the said support armatures, a third housing, 23, capable of permitting the introduction of third means for securing the said longitudinal members 14, 15 to the said lateral guides 19 and/or different members for regulating the flow of objects 1.

The first, second and third housings 34, 32, 23 are, provided longitudinally along the said longitudinal members, that is to say all along the conveying device according to the invention.

The first, second and third securing means are constituted, in particular, by a screw and nut system, the heads of the said screws being provided in the said housings 34, 32, 23.

The longitudinal members 14, 15 can also, possibly, have a groove, 33, suitable for permitting insertion of the said cheek members 36.

According to a first form of embodiment, the longitudinal members, 14, 15, are constituted by a specially shaped aluminium piece, possibly substantially quadrangular, for example hollow.

Thus, according to the exemplary form of embodiment illustrated, the first housing, 34, is provided on their lateral face, opposite blowing chamber 4, the second housing, 32, is provided on their other lateral face, and the said third housing, 23, as well as the said groove 33, are provided on their lower face.

In addition, the longitudinal members 14, 15 have an upper face, possibly smooth and curving inwards and downwards, so as to prevent dirt from accumulating in this area.

The longitudinal members 14, 15 are further, possibly, provided, with a centering orifice, 55, making it possible to align them horizontally thanks to centering members, not shown.

In this connection, the said second housing 32 can be used to enhance this alignment further by means of fish-plates, not shown, provided at each junction. It can also be used, possibly, to receive means for supporting auxiliary devices such as, for example, display panels, devices for halting the objects conveyed and/or others.

This being the case, according to the particular form of embodiment shown, the device according to the invention includes, as mentioned earlier, lateral guides 19. The latter are constituted, in particular, at least by a guide rail, 20, provided along the device opposite the bodies of the objects 1 and the support rods 31 of the rail 20. The support rods 31 are provided, at regular intervals and are secured in longitudinal members 14, 15 in the area of the said third housing 23.

As mentioned earlier, in order to be able to ensure more easily adjustment of the transverse position, in the direction of arrow 21, of guide rail 20 in relation to the said objects 1, and thus determine residual play according to the horizontal cross-section of the latter, the rods 31 and the rail 20 co-operate with one another at least by rotary articulation.

This type of articulation makes it possible to simplify the adjustment of lateral guides 19, particularly when cheek members 36 are present, as detailed hereinafter.

The invention also relates, in fact, to a conveying device such as described below, namely one including a blowing chamber 4 permitting the projection of an air stream capable of driving the said objects 1, a support rail 5, capable of co-operating with the said objects 1 in the area of their protuberance 2, and lateral guides, 19, capable of facilitating the transport of the said objects 1, the device being characterized by the fact that the lateral guides 19 are constituted at least by a guide rail 20, provided along the said device facing the bodies of the said objects 1, and by rods 31 for supporting the said rail 20.

The device according to the invention includes, two said guide rails 20, disposed on either side of the body of the said objects 1 with slight residual play. The support rods 31 are, in particular, spaced at regular intervals along the said device.

Figure 3:
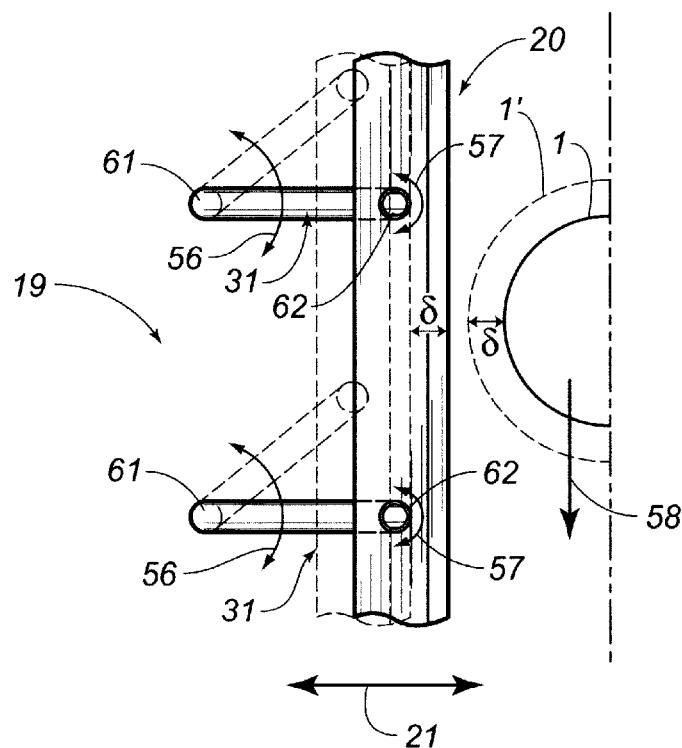
FIG. 3 is a cross-sectional top half view showing the articulation principle of the lateral guides, if any, used in the conveying device according to the invention.

With reference to FIG. 3, it will be noted that the said rods 31 and the said rail 20 co-operate with one another at least by rotary articulation, in particular in the direction of arrows 56, 57. The said guides thus make it possible to adjust easily the transverse position of the said rail 20, in the direction of arrow 21, in relation to the said objects.

Indeed, according to the angular offset chosen, the center to center distance between the said guide rails 20 is adapted to the overall dimensions of transported objects 1, 1', as represented in dotted lines, while the support rods, 31, or at the very least a part of the said support rods 31, remain in the same position.

In addition, thanks to such articulations, adjustment of the angular position of one of support rods 31 makes it possible, through the displacement caused by corresponding guide rail 20, to drive simultaneously the other support rods 31 co-operating with the said rail 20. The device can thus be adjusted more quickly.

It should be noted that, in FIG. 3, the conveying direction for objects 1 is represented by arrow 58 .

With further reference to FIGS. 1 and 2, it will be noted that the vertical position of the said guide rails 20 can also, possibly, be adjusted. The latter are thus mobile, for example, in translation along the said supports 31, in particular in the direction of arrow 22.

According to the form of embodiment illustrated, the support rods 31 can be articulated about substantially vertical axes, 59, and the said guide rail 20 can be articulated in relation to axes 60, also substantially vertical, off-centered in relation to the said axes of rotation 59 of rods 31 and integral with the rods 31. The axes 59, 60 are thus, in particular, substantially parallel.

The said guide rails 20 and their support rods 31 can thus be adjusted, for example, at the time of installing the device and/or between each change in the type of object 1 to be transported. When the said objects are conveyed, the said guide rails 20 and their support rods 31 are naturally locked in position.

According to the particular form of embodiment illustrated, the said support rods 31 of the said lateral guides 19 are U-shaped. One of the legs, 61, of the U is located along the said axis of rotation 59, while the other one, 62, is located along the said off-centered axis 60 and enables the said guide rail 20 to be positioned vertically, free to rotate about the said leg 62.

One, 61, of the legs of the U can be longer than the other, 62, and the lateral guides, 19, are then in the shape of a hook.

The said guide rails 20 are constituted, by rotary members, 63, co-operating with the said rods 31, through which slides a guide rod 64, provided along the path of the said objects 1.

According to a first form of embodiment, the said lateral guides 19 are supported by the said blowing chamber 4. More precisely, the said blowing chamber 4 is of quadrangular design and the said lateral guides 19 are supported, by the inner face and/or the lateral faces of blowing chamber 4.

According to another form of embodiment, corresponding to those illustrated, the said lateral guides 19 are supported by longitudinal members 14, 15, possibly provided in the device according to the invention on either side of the rail 5 along the blowing chamber 4.

In addition, the said support rods 31 are capable, of ensuring the support of cheek members 36, designed to protect the said objects along their path. For this purpose, the device according to the invention includes, in particular, armatures 65 for supporting the said cheek members 36 co-operating with the said rods 31 via collars, or flanges, 66, in which the said rods 31 are free to rotate.

Figure 4:
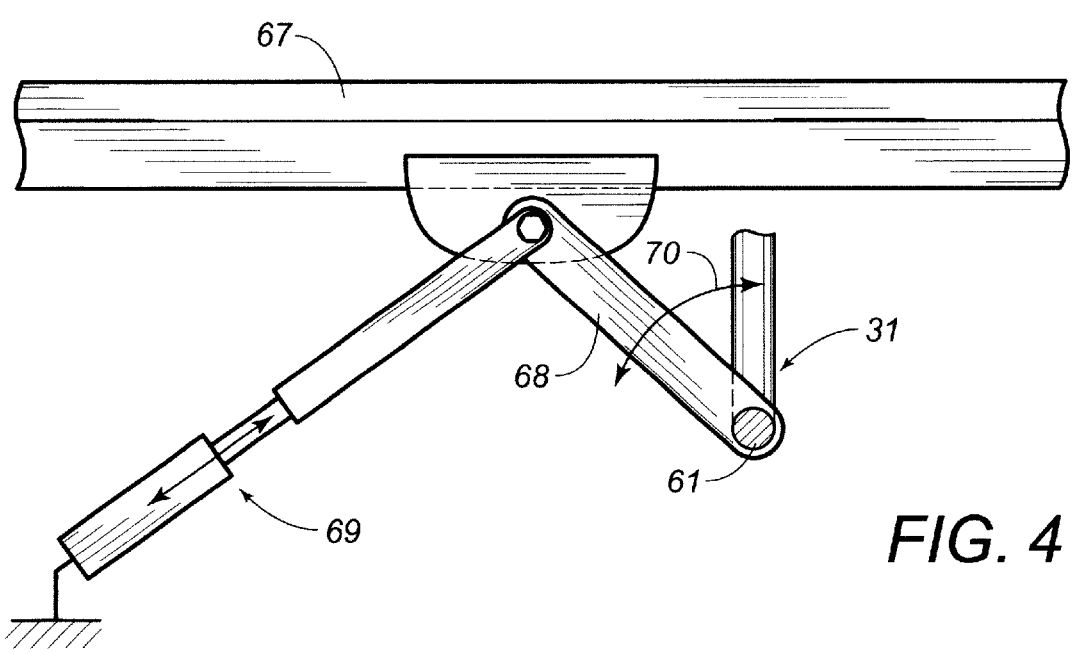
FIG. 4 illustrates an alternative implementation of the lateral guides, if any, used in the conveying device according to the invention.

As illustrated in FIG. 4, the said rods 31 are further suitable, possibly, for supporting a second lateral guide rod, 67, via a link, 68, rotationally articulated, on one hand, about the said rods 31, and more especially about their legs 61, and, on the other hand, about the said second rod 67.

A piston type jack, 69, mounted on a fixed portion of the device, controls the rotation, in the direction of arrow 70, of the said link 68 about the said leg 61.

The center to center distance of the said second rods 67 can thus be adjusted and makes it possible, during operation, while the center to center distance of the first rods 64 is fixed, to permit modulation of the lateral guiding system to adapt it, from a one-liter bottle to a bottle that is narrower, a half-liter bottle, and vice versa.

Other forms of embodiment, within the grasp of a man of the art, could, of course, have been contemplated, without thereby departing from the scope of the present invention.

What is claimed is:

1. An apparatus for conveying an object which has a protuberance in an area of a neck thereof, the apparatus comprising:
    a blowing chamber suitable for allowing a projection of air to pass therethrough;
    a support rail having an area suitable for cooperating with the object in the area of the protuberance, said blowing chamber having a body and an apron, said support rail being secured to said apron, said body having lateral sides;
    a plurality of longitudinal members extending outwardly of said blowing chamber and laterally along said body;
    a plurality of transverse members disposed within said blowing chamber, said plurality of longitudinal members and said plurality of transverse members stiffening said lateral sides such that said apron is removable from said body; and
    a plurality of lateral guides suitable for guiding the object, said plurality of longitudinal members having respective housings supporting respective lateral guides.

2. The apparatus of claim 1, further comprising:
    a reinforcing armature formed by arches spaced at regular intervals, said reinforcing armature and said plurality of longitudinal members sandwiching respective lateral sides of said body.

3. The apparatus of claim 1, further comprising:
    sealing means affixed to said body, said sealing means for sealing a connection between said apron and said body.

4. The apparatus of claim 3, said sealing means comprising said plurality of longitudinal members and joints affixed along said apron, said joints being respectively cooperative with said plurality of longitudinal members.

5. The apparatus of claim 4, said plurality of longitudinal members having at least one groove receiving said joints.

6. The apparatus of claim 1, each of said plurality of lateral guides comprising:
    a guide rail, and
    a rod supporting said guide rail, said rod and said guide rail being cooperative with each other by rotary articulation so as to permit an adjustment of the position of said guide rail relative to the object.

7. The apparatus of claim 2, said body having a cover thereon, said arches being secured to said cover.

8. The apparatus of claim 7, said cover having a U-shape defining a trough between said lateral sides of said body.

9. An apparatus for conveying objects in which each object has a neck with a protuberance extending outwardly therefrom, the apparatus comprising:
    a blowing chamber suitable for allowing a projection of a stream of air therethrough for driving the objects, said blowing chamber having supporting armatures affixed thereto;
    a support rail capable of cooperating with the objects in an area adjacent the protuberance;
    lateral guides extgending outwardly of said blowing chamber;
    an apron secured to said support rail;
    cheek members suitable for protecting the objects during travel through said blowing chamber;
    at least two longitudinal members affixed to said apron on respective sides of said blowing chamber, said longitudinal members respectively receiving said cheek members;
    a first housing having a securing means for securing said longitudinal members to said blowing chamber;
    a second housing having a securing means for securing said longitudinal members respectively to said supporting armatures; and
    a third housing having a securing means for securing said longitudinal members respectively to said lateral guides, said lateral guides adapted to facilitate movement of the objects.

10. The apparatus of claim 9, each of said longitudinal members having a groove formed therein, said groove receiving one of said cheek members therein.

11. The apparatus of claim 9, each of said longitudinal members being of shaped aluminum material.

12. The apparatus of claim 10, each of said longitudinal members being subsantially quadrangular, said first housing being affixed to a lateral face of at least one of said longitudinal members opposite said blowing chambers, said second housing affixed to another lateral face of the longitudinal member, said third housing and said groove formed on a lower lateral face of the longitudinal member.

13. The apparatus of claim 12, each of said longitudinal members having a smooth upper face curving outwardly and downwardly.

14. The apparatus of claim 9, each of said lateral guides having a guide rail and a rod supporting said guide rail, said rod and said guide rail being co-operative with one another by rotary articulation so as to allow an adjustment of a transverse portion of said guide rail relative to the objects.

15. An apparatus for conveying objects in which each object has a neck with a protuberance extending outwardly therefrom, the apparatus comprising:
    a blowing chamber suitable for allowing a projection of a stream of air therethrough for driving the objects;
    a support rail capable of cooperating with objects in an area adjacent the protuberance;
    a plurality of lateral guides capable of facilitating transport of the objects, each of said plurality of guide rails having at least one guide rail positioned so as to face a body of the objects; and
    a plurality of rods respectively supporting the guide rails, said rods and the guide rails being cooperative with each other by rotary articulation so as to adjust a transverse position of the guide rails relative to the objects, said plurality of rods capable of rotary articulation about substantially vertical axes, said guide rail capable of rotary articulation about a substantially vertical axis, said vertical axis being off-center relative to respective said substantially vertical axes of said plurality of rods, said vertical axis being integrally connected to a respective rod of said plurality of rods, each of said plurality of rods being U-shaped, one leg of the rod being located along one of said vertical axes, said guide rail vertically adjustable along another leg of the rod.

16. The apparatus of claim 15, said plurality of lateral guides being supported by said blowing chamber.

17. The apparatus of claim 16, said blowing chamber being of a quadrangular configuration, said plurality of lateral guides being supported by either a lower face or lateral faces of said blowing chamber.

18. The apparatus of claim 15, further comprising:
a plurality of longitudinal members positioned on opposite sides of said support rail and extending along said blowing chamber, said plurality of lateral guides being supported by said longitudinal members.

19. The apparatus of claim 15, said plurality of support rods respectively supporting cheek members, said cheek members suitable for protecting the objects during travel.

* * * * *